United States Patent Office 3,169,125
Patented Feb. 9, 1965

3,169,125
WATER-SOLUBLE DISAZO DYES CONTAINING REACTIVE GROUPS
Hans Ischer, Basel, and Carl Ryffel, Dornach, Solothurn, Switzerland, assignors to Sandoz Ltd. (A/K/A Sandoz AG.), Basel, Switzerland
No Drawing. Filed Oct. 26, 1961, Ser. No. 147,724
Claims priority, application Switzerland, Oct. 28, 1960, 12,086/60
6 Claims. (Cl. 260—181)

This invention relates to water-soluble disazo dyes which contain reactive groups and have the formula

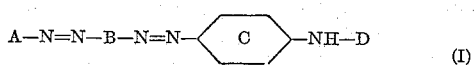

wherein
A represents the radical of a coupling component coupled in a position adjacent to a hydroxy group or an amino group, the latter of which may be substituted,
B a diphenyl radical which may be substituted, with the exception of the radical of 3,3'-dimethyl-1,1'-diphenyl-6,6'-disulfonic acid, bound in the positions 4,4',
D a halogenated, saturated aliphatic acyl radical or a halogenated or unhalogenated, unsaturated aliphatic acyl radical, and the nucleus C may be further substituted.

The process for the production of these reactive disazo dyes consists in reacting a water-soluble disazo dye of the formula

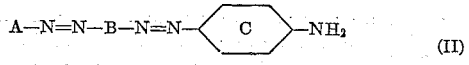

with a functional derivative of a halogenated, saturated aliphatic acid or of a halogenated or unhalogenated, unsaturated aliphatic acid, the constituents A, B and C being so chosen that the final dye possesses the number of water solubilizing groups necessary to render it soluble in water.

A second process consists in coupling the diazo compound of an amine of the formula

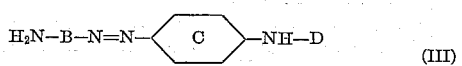

with a coupling component coupling in a position adjacent to a hydroxy or amino group.

The aminoazo dye of Formula II used as starting product is obtained by coupling e.g. the tetrazo compound of 1 mol of a substituted or unsubstituted 4,4'-diamino-1,1'-diphenyl according to the invention with 1 mol of a coupling component according to the invention and 1 mol of an aminobenzene which couples in paraposition to the amino group and may be further substituted.

Examples of suitable coupling components of the naphthalene series on which the radical A is based are hydroxynaphthalene-mono-, or -di- or -tri- sulfonic acids such as 1-hydroxynaphthalene, 4- or -5-sulfonic acid, 2-hydroxynaphthalene-4-, -6-, -7- or -8- sulfonic acid, 1-hydroxynaphthalene-3,6-, -4,6-, -4,7- or -4,8- disulfonic acid, 2-hydroxynaphthalene-3,6- and -6,8-disulfonic acid, 1-hydroxy- and 2-hydroxynaphthalene-3,6,8-trisulfonic acid or their mixtures, 2-hydroxynaphthalene, the components coupling in acid solution: 2-amino-8-hydroxynaphthalene-6-sulfonic acid, 2-amino-8-hydroxynaphthalene-3,6-disulfonic acid, 2 - (2',4',6'-trimethyl)-phenylamino-8-hydroxynaphthalene-6-sulfonic acid, 2-aminonaphthalene-6- or -7-sulfonic acid and their N-methyl derivatives; further acylamino-hydroxynaphthalenemono- and -disulfonic acids, e.g. 2-acetylamino-5-hydroxynaphthalene-7-sulfonic acid, 1-benzoylamino-8-hydroxynaphthalene-3,6-disulfonic acid, 2-N-carbomethoxyamino- or 2 - N-carbethoxyamino-5-hydroxynaphthalene-1,7-disulfonic acid and 1,8-dihydroxynaphthalene-3,6-disulfonic acid.

Other suitable coupling components are e.g. 1-hydroxy-4-methyl-benzene, 1-(2',5'-dichloro)-phenyl-3-methyl-5-pyrazolone-4'-sulfonic acid, 1-phenyl-3-methyl-5-pyrazolone, 1 - (2'-chloro-6'-methyl)-phenyl-3-methyl-5-pyrazolone, 1 - phenyl - 5 - pyrazolone-3-carboxylic acid, acetoacetylamino-benzene, 1-acetoacetylamino-2,5-dimethoxybenzene, 1-phenyl-3-methyl-5-pyrazolone-2',4'- or -2',5'-disulfonic acid or -2'-, -3'- or -4'-monosulfonic acid.

Important aminobenzenes which contain the radical C are: aminobenzene, 1-amino-2- or -3-methylbenzene, 1-amino - 3 - acetylaminobenzene, 1-amino-2,5-dimethoxybenzene, 1-amino-5-methyl-2-methoxybenzene, 1-amino-3-propionyl- or -butyrylamino-benzene, 1,3-diaminobenzene, 1-amino-2,5-dimethylbenzene, 1-amino-2,3-tetramethylenebenzene.

Examples of diamino compounds containing the radical B are e.g.

4,4'-diamino-2,2'-dimethyl-1,1'-diphenyl,
4,4'-diamino-1,1'-diphenyl,
4,4'-diamino-2,2'-dimethyl-1,1'-diphenyl-5-sulfonic acid,
4,4'-diamino-2,2'-dimethyl-1,1'-diphenyl-6-sulfonic acid,
4,4'-diamino-1,1'-diphenyl-2,2'-disulfonic acid,
4,4'-diamino-1,1'-diphenyl-3,3'-disulfonic acid,
4,4'-diamino-1,1'-diphenyl-2,2',5,5'-tetrasulfonic acid,
4,4'-diamino-3,3'-diethyl-1,1'-diphenyl-6,6'-disulfonic acid,
4,4'-diamino-3,3'-dimethoxy-1,1'-diphenyl-6,6'-disulfonic acid,
4,4'-diamino-1,1'-diphenyl-3,3'-dicarboxylic acid,
4,4'-diamino-3,3'-dimethoxy-1,1'-diphenyl,
4,4'-diamino-3,3'-dimethyl-1,1'-diphenyl,
4,4'-diamino-3,3'-diethyl-1,1'-diphenyl,
4,4'-diamino-1,1'-diphenyl-6,6'-sulfone-3,3'-disulfonic acid.

The substituent D is preferably the radical of one of the following acids: chloroacetic, bromoacetic, β-chloro- and β-bromopropionic, propiolic, acrylic, methacrylic, α-chloro-, β-chloro-, α-bromo- and β-bromoacrylic acid, α,β- and β,β-dichloro- or -dibromoacrylic, trichloro- or tribromoacrylic, crotonic, α-, β-, γ- bromo- or -chlorocrotonic, α,β-dichlorocrotonic, monochloro- and monobromomaleic, dichloro- and dibromomaleic, monochloro- and monobromofuramic, dichloro- and dibromofumaric acid.

The introduction of the acid radicals is most easily effected by using the corresponding acid halides, or in some cases the acid anhydrides. It is preferable to work in an aqueous medium, if necessary in presence of an organic solvent, e.g. acetone, at low temperatures, e.g. 0–20° C., and in presence of an acid binding agent such as sodium carbonate, sodium hydroxide, calcium carbonate, calcium hydroxide, sodium acetate or pyridine, which may also act as a catalyst, at a weakly acid, neutral or weakly alkaline reaction, e.g. in the pH range 4 to 9. For acylation, the carboxylic acid chlorides are employed as such or in solution in two to five times their amount of benzene, chlorobenzene, methylbenzene, dimethylbenzene or acetone, and added dropwise to the aqueous, well buffered solution of the compound containing the amino group, at a temperature of e.g. 2–5° C. Acylation with the anhydrides can be carried out in a similar way.

On completion of condensation or coupling the solution or suspension may be neutralized and the final reactive dye is then salted out with sodium or potassium chloride or precipitated with acid, filtered with suction, washed and dried.

The reactive dyes conforming to the invention are suitable, depending upon their constitution, for the dyeing, padding and printing of fibers of animal origin, e.g. wool and silk; synthetic polyamide fibers, e.g. nylon; leather; cellulosic fibers, e.g. cotton, linen; fibers of regenerated cellulose, e.g. viscose filament yarn, viscose staple fiber, cuprammonium rayon; and mixtures and/or other articles of these fibers. The optimum conditions of application vary with the type of fiber and the dyes used. Animal fibers and synthetic polyamide fibers are dyed, printed or fixed preferably in an acid, neutral or weakly alkaline medium, e.g. in presence of acetic acid, formic acid, sulfuric acid, ammonium sulfate, sodium metaphosphate etc. They can also be applied from an acetic acid to neutral medium in presence of levelling agents, e.g. polyoxyethylated fatty amines or mixtures of these and alkylpolyglycol ethers, and the bath adjusted to a neutral or weakly alkaline reaction on completion of dyeing by the addition of small amounts of an agent of alkaline reaction, e.g. ammonia, sodium bicarbonate, sodium carbonate etc., or compounds which react alkaline on heating, e.g. hexamethylene tetramine or urea. The goods are then well rinsed and if necessary acidified with a little acetic acid.

The dyeing, padding, printing or fixation of the dyes on cellulosic fibers is carried out advantageously in alkaline medium, e.g. in presence of sodium carbonate, sodium bicarbonate, sodium hydroxide solution, potassium hydroxide solution, sodium metasilicate, sodium borate, trisodium phosphate, ammonia etc. To avoid reduction effects during dyeing, padding or printing it is often of advantage to add a mild oxidizing agent, e.g. sodium 1-nitrobenzene-3-sulfonate. As a rule fixation of the dyestuffs on cellulosic fibers is also effected with heating. A number of the dyes, depending on the reactivity of the reactive group, can be fixed at low temperatures, e.g. 20–40° C.

The dyeings and prints on cellulosic fibers possess outstanding wet fastness properties due to the formation of a stable chemical linkage between the dye molecule and the cellulose molecule. Often the total amount of applied dye does not take part in the reaction with the fiber and the unreacted dye must then be removed from the fiber by suitable treatment such as washing and/or soaping, if necessary at higher temperatures, for which purpose synthetic detergents, e.g. alkylarylsulfonates, sodium lauryl sulfate, sodium lauryl polyglycol ether sulfate, mono- and dialkylphenolpolyglycol ethers can be used. The dyeings on wool possess excellent fastness to light, perspiration, washing, sea water, milling and dry cleaning, and in most cases good level dyeing properties.

The dyeings and prints on cotton are fast to light, perspiration, water, sea water, alkali, washing, rubbing and dry cleaning.

In the following examples the parts and percentages are by weight and the temperatures in degrees centigrade.

EXAMPLE 1

17.2 parts of 4,4′-diamino-1,1′-diphenyl-2,2′-disulfonic acid are dissolved in 50 parts of water with the addition of about 13.6 parts of 30% sodium hydroxide solution. After the addition of 6.9 parts of sodium nitrite the solution is run at 0–15° into a solution of 27 parts of 30% hydrochloric acid in 200 parts of water. To the tetrazo compound is added a solution of 12.3 parts of 1-hydroxynaphthalene-4-sulfonic acid in 70 parts of water. After the addition of 100 parts of finely crushed ice, a solution of 14.8 parts of crystallized sodium acetate in 15 parts of water is added dropwise in the course of 3 hours. The coupling mass is stirred over-night at 0° and next morning adjusted to a weakly alkaline reaction with sodium carbonate. After stirring for some time the suspension is adjusted to pH 5 with dilute acetic acid, and 4.8 parts of 1-amino-3-methylbenzene are added. After stirring for about 10 hours sodium hydroxide solution is added to give a weakly alkaline reaction and the solution treated with a mixture of 3 parts of blood charcoal and 3 parts of infusorial earth. After filtration the aminodisazo dye is precipitated by the addition of 30% hydrochloric acid and filtered off.

The filter residue is dissolved in 1000 parts of water at 60° and the pH of the solution adjusted to 5–7. After cooling to 0–5° at least 6.4 parts of β-chloropropionyl chloride are dropped in and the mass stirred for 4 hours at this temperature. By dropwise addition of dilute sodium carbonate solution the pH value is maintained between 5 and 7. On completion of acylation the dye is precipitated with sodium chloride, suction filtered, the press cake washed with sodium chloride solution and dried. The ground dye is a red powder which dissolves in water to give red solutions.

A mercerized cotton fabric is printed with a paste of the following composition:

30 parts of the dye of this example,
100 parts of urea,
385 parts of water,
450 parts of 4% sodium alginate thickening,
10 parts of sodium 1-nitrobenzene-3-sulfonate,
25 parts of sodium carbonate 1000 parts The print is dried and fixed by steaming for 10 minutes. It is then washed in cold and warm water, soaped at the boil if necessary, rinsed again in hot and cold water, and finally dried. A brilliant scarlet print with outstanding fastness to water treatments and good light fastness is obtained.

When in place of 4.8 parts of 1-amino-3-methyl-benzene, the equivalent amount of the following aminobenzenes: aminobenzene, 1-amino-2-methylbenzene, 1-amino-3-acetylamino-, -3-propionylamino- or -3-butyrylaminobenzene, 1-amino-2.5-dimethyl- or 2.5 - dimethoxybenzene, 1-amino-2-methoxy - 5 - methylbenzene, 1.3 - diaminobenzene or 1-amino-2.3-tetramethylenebenzene is used, and the procedure of this example is followed in all other particulars, a scarlet dye with very similar properties is obtained.

EXAMPLE 2

76.8 parts of the disazo dye obtained by coupling 1 mol of 4-diazo-4′-acetylamino-2,2′-dimethyl-1,1′-diphenyl - 5-sulfonic acid with 1 mol of 1-hydroxynaphthalene-4,6-disulfonic acid, splitting off the acetyl group, diazotizing and coupling with 1 mol of 1-acetylamino-3-aminobenzene, are dissolved in 2500 parts of water. This solution is cooled to 0–5° and acylated by the gradual addition of 11.3 parts of chloroacetyl chloride with stirring. At the same time sodium bicarbonate is strewn in to maintain the pH of the solution between 5 and 7. After the addition of the chloroacetyl chloride stirring is continued for 1–2 hours at the same temperature. If the reaction is not yet completed some more chloroacetyl chloride is added. As soon as no further free amino groups are indicated the mass is neutralized with sodium carbonate solution, and the new dye salted out with sodium chloride, isolated and dried at low temperature. A red powder is obtained which dissolves in water with a clear red coloration. It is dyed on wool from an acetic acid bath in which a wetting agent can be included if necessary, and gives a brilliant scarlet dyeing of excellent levelness, very good light fastness and excellent wet fastness.

2 parts of the above-described dye are dissolved in 4000 parts of water at room temperature and the solution heated to 40°, with the subsequent addition of 2 parts of acetic acid and 3 parts of a mixture of a polyoxyethylated fatty amine and an alkyl polyglycolether. 100 parts of a wool fabric are entered in this bath which is then brought to the boil in 15–20 minutes and held at the boil for 45–60 minutes. At 85–90° about 5 parts of 5% ammonia or 3 parts of hexamethylene tetramine are added and treatment continued for 20 minutes at 90°. The dyed wool is then thoroughly rinsed with a little acetic acid in one lot of the rinsing water and dried. A level scarlet dyeing fast to washing, perspiration and milling and with good light fastness is obtained.

When in place of 11.3 parts of chloroacetyl chloride 12.6 parts of β-chloropropionyl chloride or 9 parts of acrylic acid chloride or 13.2 parts of monochloromaleic acid anhydride are used, dyes with very similar properties are obtained.

EXAMPLE 3

69.8 parts of the disazo dye obtained by tetrazotizing 1 mol of 4,4'-diamino-1,1'-diphenyl-2,2'-disulfonic acid and subsequent coupling with 1 mol of 1-hydroxynaphthalene-4-sulfonic acid and 1 mol of 1,3-diaminobenzene, are gradually added in portions to a mixture at 20–40° of 80 parts of chloroacetic acid, 50 parts of sulfuric acid monohydrate and 20 parts of 60% oleum so that the temperature does not rise to above 40°. At the same time 80 parts of 65% oleum are run in slowly. The mass is subsequently stirred for 12–15 hours at room temperature. The next morning no further free amino groups are indicated. The reaction mass is run into ice and the precipitated dye filtered off, stirred into 2000 parts of cold water and neutralized with 20% sodium carbonate solution. It is then salted out, and the sodium salt of the dye formed filtered off and dried at low temperature with vacuum.

A red powder is obtained which dissolves in water with a scarlet coloration and dyes wool and polyamide fibers, if necessary with the addition of a wetting agent, in level shades very fast to light and wet treatments.

The following table contains further valuable dyes of the Formula I, which can be obtained according to the particulars of Examples 1 to 3 and are characterized by the symbols A, B, C and D and by the shade of their dyeings on wool.

Table

| No. | A = (I) | B = Radical Bound in 4,4' and Derived from (II) | Coupling Component for the Introduction of the Radical C (III) | D = (IV) | Shade of Dyeing on Wool (V) |
|---|---|---|---|---|---|
| 4 | 1-hydroxy-3,6-disulfo-2-naphthyl | 2,2'-dimethyl-1,1'-diphenyl-5-sulfonic acid | Aminobenzene | Chloracetyl | Orange. |
| 5 | 2-hydroxy-6-sulfo-1-naphthyl | do | 1-amino-2,5-dimethylbenzene | β-Chloropropionyl | Do. |
| 6 | 1-hydroxy-4,6-disulfo-2-naphthyl | 3,3'-dimethoxy-1,1'-diphenyl | 1-amino-3-acetylaminobenzene | α-Chloracrylyl | Violet. |
| 7 | 1-hydroxy-3,6,8-trisulfo-2-naphthyl | 2-2'-dimethyl-1,1'-diphenyl | 1-amino-2,5-dimethylbenzene | Acrylyl | Red. |
| 8 | 2-hydroxy-3,6,8-trisulfo-1-naphthyl | 1-1'-diphenyl | 1-amino-2,5-dimethoxybenzene | α,β-dichloracrylyl | Do. |
| 9 | 2-hydroxy-1-naphthyl | 1,1'-diphenyl-2,5,2',5'-tetrasulfonic acid | Aminobenzene | γ-Chlorocrotonyl | Scarlet. |
| 10 | 1-hydroxy-4,7-disulfo-2-naphthyl | 2,2'-dimethyl-1,1'-diphenyl-6-sulfonic acid | 1-amino-2-methoxy-5-methyl-benzene | Trichloracrylyl | Do. |
| 11 | 1-hydroxy-4-sulfo-2-naphthyl | 1,1'-diphenyl-3,3'-disulfonic acid | 1-amino-2,3-tetramethylene-benzene | Chloracetyl | Orange. |
| 12 | do | 3,3'-diethyl-1,1'-diphenyl-6,6'-disulfonic acid | 1-amino-3-methylbenzene | do | Scarlet. |
| 13 | 1-hydroxy-5-sulfo-2-naphthyl | 1,1'-diphenyl-3-sulfonic acid | 1-amino-3-propionylamino-benzene | Bromacetyl | Orange. |
| 14 | 1-hydroxy-3,6-disulfo-2-naphthyl | 2,2'-dimethyl-1,1'-diphenyl-5-sulfonic acid | 1-amino-3-methylbenzene | Propiolyl | Do. |
| 15 | 1-hydroxy-4-sulfo-2-naphthyl | 3,3'-diethyl-1,1'-diphenyl-6,6'-disulfonic acid | 1-amino-2,5-dimethylbenzene | Chloracetyl | Scarlet. |
| 16 | do | do | 1-amino-2-methylbenzene | do | Do. |
| 17 | 2-hydroxy-3,6-disulfo-1-naphthyl | 2-2'-dimethyl-1,1'-diphenyl-5-sulfonic acid | do | β-Bromopropionyl | Orange. |
| 18 | 1-hydroxy-4-sulfo-6-chloro-2-naphthyl | do | 1-amino-2,5-dimethylbenzene | Methacrylyl | Scarlet. |
| 19 | 1-hydroxy-4,8-disulfo-2-naphthyl | 1,1'-diphenyl-3,3'-dicarboxylic acid | Aminobenzene | α,β-Dibrom-acrylyl | Red. |
| 20 | 1-hydroxy-3,5-disulfo-8-amino-2-naphthyl | 2,2'-dimethyl-1,1'-diphenyl-6-sulfonic acid | 1-amino-3-methoxy-benzene | Chloracetyl | Violet. |
| 21 | 1-hydroxy-3,6,8-trisulfo-2-naphthyl | 3,3'-dimethyl-1,1'-diphenyl | 1-amino-2,5-dimethylbenzene | Crotonyl | Red. |
| 22 | 1-hydroxy-3,8-disulfo-2-naphthyl | 2,2'-dimethyl-1,1'-diphenyl-5-sulfonic acid | 1-amino-3-butyryl-aminobenzene | β-Chloropropionyl | Orange. |
| 23 | 2-hydroxy-3,6,6-trisulfo-1-naphthyl | 3,3'-diethyl-1,1'-diphenyl | 1-amino-2,5-dimethylbenzene | α-Bromacrylyl | Do. |
| 24 | 2-hydroxy-7-sulfo-1-naphthyl | 1-1'-diphenyl-3-sulfonic acid | do | β,β-Dichloracrylyl | Do. |
| 25 | 2-acetylamino-5-hydroxy-7-sulfo-6-naphthyl | 1,1'-diphenyl-2,2'-sulfone-5,5'-disulfonic acid | do | γ-Bromocrotonyl | Violet. |
| 26 | 2-hydroxy-8-sulfo-1-naphthyl | 3,3'-dimethoxy-1,1'-diphenyl-6,6'-disulfonic acid | Aminobenzene | α,β-Dichlorocrotonyl | Do. |
| 27 | 1-hydroxy-4-sulfo-6-chloro-2-naphthyl | 1,1'-diphenyl-2,2'-disulfonic acid | 1-amino-2,5-dimethylbenzene | β-Chloro-β-carboxy-acrylyl | Scarlet. |
| 28 | 2-benzoylamino-5-hydroxy-7-sulfo-6-naphthyl | do | do | α-Chloro-β-carboxy-acrylyl | Violet. |
| 29 | 2-amino-6-sulfo-1-naphthyl | 2,2'-dimethyl-1,1'-diphenyl-5-sulfonic acid | 1-amino-3-methylbenzene | α,β-Dichloro-β-carboxy-acrylyl | Red. |
| 30 | 1-hydroxy-8-benzoylamino-3,6-disulfo-2-naphthyl | do | 1-amino-2,5-dimethylbenzene | α-Bromo-β-carboxy-acrylyl | Violet. |
| 31 | 2-methylamino-6-sulfo-1-naphthyl | do | do | β-Bromo-β-carboxy-acrylyl | Red. |
| 32 | 2-amino-7-sulfo-1-naphthyl | do | 1-amino-3-methylbenzene | α-Chlorocrotonyl | Violet. |
| 33 | 1-hydroxy-3,8-disulfo-2-naphthyl | 1,1'-diphenyl-2,2'-sulfone-5,5'-disulfonic acid | 1-amino-3-propionyl-aminobenzene | Tribromacrylyl | Orange. |
| 34 | 1,8-dihydroxy-3,6-disulfo-2-naphthyl | 2,2'-dimethyl-1,1'-diphenyl-5-sulfonic acid | Aminobenzene | Bromacetyl | Violet. |
| 35 | 2-carbethoxyamino-5-hydroxy-7-sulfo-6-naphthyl | 1,1'-diphenyl-2,2'-disulfonic acid | 1-amino-2,5-dimethylbenzene | β-Bromocrotonyl | Do. |

Table—Continued

| No. | A= (I) | B = Radical Bound in 4,4' and Derived from (II) | Coupling Component for the Introduction of the Radical C (III) | D= (IV) | Shade of Dyeing on Wool (V) |
|---|---|---|---|---|---|
| 36 | 2-hydroxy-6,8-disulfo-1-naphthyl | 2,2'-dimethyl-1,1'-diphenyl-5-sulfonic acid. | 1-amino-3-methylbenzene | α,β-Dibromo-β-carboxy-acrylyl. | Orange. |
| 37 | 2-carbomethoxyamino-5-hydroxy-1,7-disulfo-6-naphthyl. | ----do---- | ----do---- | Chloracetyl. | Red. |
| 38 | 2-acetylamino-8-hydroxy 6-sulfo-7-naphthyl. | ----do---- | ----do---- | α-Bromocrotonyl. | Violet. |
| 39 | 2-propionylamino-5-hydroxy-7-sulfo-6-naphthyl. | ----do---- | ----do---- | α,β-Dichloro-β-carboxy-acrylyl. | Do. |
| 40 | 2-amino-8-hydroxy-6-sulfo-1-naphthyl. | 1,1'-diphenyl-2,2'-sulfone-5,5'-disulfonic acid. | 1-amino-3-butyryl-aminobenzene | Chloracetyl. | Do. |
| 41 | 1-hydroxy-8-acetylamino-3,6-disulfo-2-naphthyl. | ----do---- | Aminobenzene | β,β-Dibromo-acrylyl. | Do. |
| 42 | 1-hydroxy-4-methyl-2-phenyl | 1,1'-diphenyl-2,2'-disulfonic acid | 1-amino-2,5-dimethylbenzene | β-Bromacrylyl. | Yellow. |
| 43 | 1-(2',5'-dichloro-4'-sulfo)-phenyl-3-methyl-5-pyrazolonyl-4. | ----do---- | 1-amino-3-methylbenzene | Chloracetyl. | Do. |
| 44 | 1-(4'-sulfo)-phenyl-3-methyl-5-pyrazolonyl-4. | 2,2'-dimethyl-1,1'-diphenyl-5-sulfonic acid. | 1-amino-2-methylbenzene | ----do---- | Do. |
| 45 | 1-(4'-sulfo)-phenyl-aminocarbonyl-1-acetonyl. | ----do---- | 1-amino-3-acetylaminobenzene | ----do---- | Do. |
| 46 | 2-amino-8-hydroxy-6-sulfo-1-naphthyl. | ----do---- | 1-amino-2,5-dimethylbenzene | β-Chloracrylyl. | Violet. |
| 47 | 1-(6',8'-disulfo)-naphthyl-(2')-3-methyl-5-pyrazolonyl-4. | 1,1'-diphenyl-2,2'-disulfonic acid | 1-amino-3-methylbenzene | β-Chloropropionyl | Yellow. |
| 48 | 1-(2',5'-disulfo)-phenyl-3-methyl-5-pyrazolonyl-4. | 3,3'-dimethyl-1,1'-diphenyl | ----do---- | ----do---- | Do. |
| 49 | 1-(2',5'-disulfo)-phenylaminocarbonyl-1-acetonyl. | ----do---- | Aminobenzene | ----do---- | Do. |
| 50 | 1-(2',5'-dimethoxy)-phenylaminocarbonyl-1-acetonyl. | 1,1'-diphenyl-2,2',5,5'-tetrasulfonic acid. | 1-amino-2,5-dimethylbenzene | ----do---- | Do. |
| 51 | 1-(2'-chloro-6'-methyl)-phenyl-3-methyl-5-pyrazolonyl-4. | ----do---- | 1-amino-3-methylbenzene | ----do---- | Do. |
| 52 | 1-(3'-sulfo)-phenyl-3-methyl-5-pyrazolonyl-4. | 2,2'-dimethyl-1,1'-diphenyl-5-sulfonic acid. | Aminobenzene | ----do---- | Do. |
| 53 | 1-(4',8'-disulfo)-naphthyl-(1')-aminocarbonyl-1-acetonyl. | ----do---- | 1-amino-3-acetyl-aminobenzene | ----do---- | Do. |
| 54 | 1-(5',7'-disulfo)-naphthyl-(2')-3-methyl-5-pyrazolonyl-4. | ----do---- | 1-amino-3-methyl-benzene | ----do---- | Do. |
| 55 | 1-(3'-sulfo)-phenyl-3-methyl-5-pyrazolonyl-4. | ----do---- | ----do---- | ----do---- | Do. |
| 56 | 1-(2',4'-disulfo)-phenyl-3-methyl-5-pyrazolonyl-4. | ----do---- | ----do---- | ----do---- | Do. |
| 57 | 1-(3'-sulfo)-phenylamino-carbonyl-1-acetonyl. | ----do---- | Aminobenzene | ----do---- | Do. |
| 58 | 1-phenyl-3-methyl-5-pyrazolonyl-4 | 1,1'-diphenyl-2,2'-disulfonic acid | 1-amino-2,5-dimethylbenzene | ----do---- | Do. |
| 59 | 1-hydroxy-3-sulfo-7-ethylurethan-2-naphthyl. | ----do---- | 1-amino-3-methyl-benzene | Bromacetyl. | Violet. |
| 60 | 2-hydroxy-4-sulfo-1-naphthyl | 2,2'-dimethyl-1,1'-diphenyl-5-sulfonic acid. | ----do---- | ----do---- | Orange. |
| 61 | 1-(2'-carboxy)-phenyl-aminocarbonyl-1-acetonyl. | 1,1'-diphenyl-2,2'-disulfonic acid | 1-amino-3-acetyl-aminobenzene | ----do---- | Yellow. |
| 62 | 2-(2',4',6'-trimethyl)-phenylamino-8-hydroxy-6-sulfo-1-naphthyl. | ----do---- | 1-amino-3-methyl-benzene | ----do---- | Blue. |
| 63 | 1-phenyl-3-carboxy-5-pyrazolonyl-4. | ----do---- | 1-amino-2,5-dimethylbenzene | ----do---- | Yellow. |
| 64 | 1-phenylaminocarbonyl-1-acetonyl. | ----do---- | 1-amino-3-methyl-benzene | ----do---- | Do. |
| 65 | 1-(2'-sulfo)-phenyl-3-methyl-5-pyrazolonyl-4. | ----do---- | Aminobenzene | ----do---- | Do. |
| 66 | 1-(4'-sulfo)-naphthyl-(1')-3-methyl-5-pyrazolonyl-4. | 1,1'-diphenyl-3,3'-disulfonic acid | 1-amino-2,5-dimethylbenzene | ----do---- | Do. |
| 67 | 1-hydroxy-3-sulfo-6-methylurethan-2-naphthyl. | ----do---- | 1-amino-3-methyl-benzene | ----do---- | Violet. |
| 68 | 1-(6',8'-disulfo)-naphthyl-(2')-aminocarbonyl-1-acetonyl. | 2,2'-dimethyl-1,1'-diphenyl-5-sulfonic acid. | ----do---- | ----do---- | Yellow. |
| 69 | 1-(4',8'-disulfo)-naphthyl-(2')-3-methyl-5-pyrazolonyl-4. | ----do---- | 1-amino-3-acetyl-aminobenzene | ----do---- | Do. |
| 70 | 2-phenylamino-8-hydroxy-6-sulfo-1-naphthyl. | ----do---- | 1-amino-3-methyl-benzene | ----do---- | Do. |
| 71 | 1-(3',6',8'-trisulfo)-naphthyl-(2')-3-methyl-5-pyrazolonyl-4. | ----do---- | 1-amino-2,5-dimethylbenzene | ----do---- | Do. |
| 72 | 1-hydroxy-3,6,8-trisulfo-2-naphthyl. | 3,3'-dimethyl-1,1'-diphenyl | 1-amino-3-methyl-benzene | Chloracetyl. | Orange. |
| 73 | 1-(4',6',8'-trisulfo)-naphthyl-(2')-aminocarbonyl-1-acetonyl. | ----do---- | Aminobenzene | ----do---- | Yellow. |
| 74 | 1-(6'/7'sulfo)-naphthyl-(1')-aminocarbonyl-1-acetonyl. | 1,1'-diphenyl-3,3-disulfonic acid | 1-amino-2,5-dimethylbenzene | ----do---- | Do. |
| 75 | 1-hydroxy-4-sulfo-8-propionyl-amino-2-naphthyl. | ----do---- | 1-amino-3-methyl-benzene | ----do---- | Violet. |
| 76 | 1-(3',6',8'-trisulfo)-naphthyl-(1')-3-methyl-5-pyrazolonyl-4. | 2,2'-dimethyl-1,1'-diphenyl-5-sulfonic acid. | 1-amino-2,5-dimethoxybenzene | ----do---- | Yellow. |
| 77 | 1-acetylamino-8-hydroxy-4-sulfo-7-naphthyl. | ----do---- | 1-amino-3-acetyl-aminobenzene | ----do---- | Violet. |
| 78 | 1-(3',6'-disulfo)-naphthyl-(1')-3-methyl-5-pyrazolonyl-4. | ----do---- | 1-amino-3-methyl-benzene | ----do---- | Yellow. |
| 79 | 2-hydroxy-3,6,8-trisulfo-1-naphthyl. | 2,2',5,5'-tetramethyl-1,1'-diphenyl | 1-amino-2,5-dimethylbenzene | ----do---- | Red. |
| 80 | 1-hydroxy-4-sulfo-6-chloro-2-naphthyl. | 3,3'-dimethoxy-1,1'-diphenyl-6,6'-disulfonic acid. | 1-amino-3-methyl-benzene | ----do---- | Do. |
| 81 | 1-(3'-sulfo)-phenyl-3-methyl-amino-4-pyrazolyl. | 1,1'-diphenyl-2,2'-disulfonic acid | ----do---- | ----do---- | Yellow. |
| 82 | 1-(4'-sulfo)-phenyl-3-methyl-amino-4-pyrazolyl. | 1,1'-diphenyl-3,3'-disulfonic acid | ----do---- | ----do---- | Do. |
| 83 | 1-hydroxy-4-sulfo-2-naphthyl | 3,3'-diethyl-1,1'-diphenyl-6,6'-disulfonic acid. | Aminobenzene | ----do---- | Scarlet. |
| 84 | 1-hydroxy-3,6,8-trisulfo-2-naphthyl. | 3,3'-dichloro-1,1'-diphenyl | 1-amino-3-methyl-benzene | ----do---- | Red. |
| 85 | 2-hydroxy-3,6,8-trisulfo-1-naphthyl. | 3,3'-diethoxy-1,1'-diphenyl | 1-amino-2,5-dimethylbenzene | ----do---- | Do. |
| 86 | 1-(4',6',8'-trisulfo)-naphthyl-(2')-3-methyl-5-pyrazolonyl-4. | 3,3'-diethyl-1,1'-diphenyl | 1-amino-2-ethylbenzene | ----do---- | Yellow. |

Formulae of representative dyes of the foregoing examples are as follows:

EXAMPLE 1

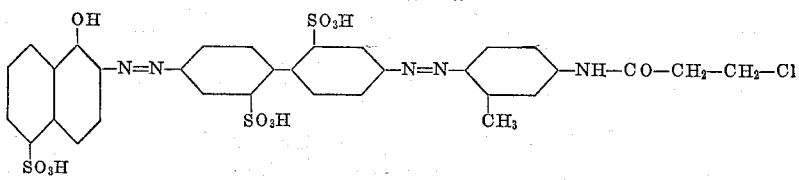

(last paragraph)

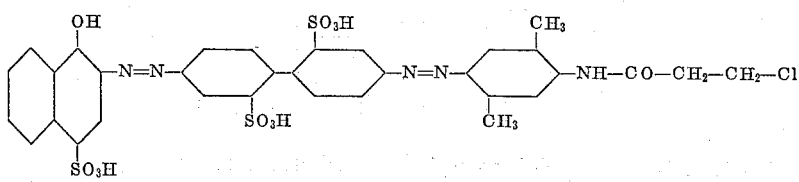

EXAMPLE 2

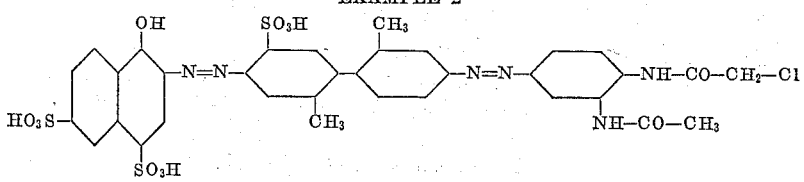

EXAMPLE 3

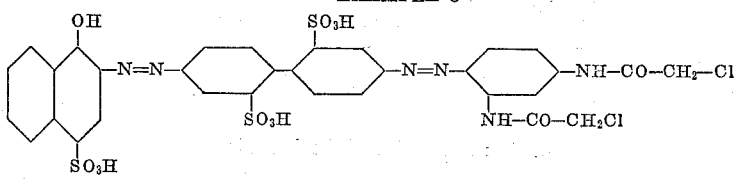

EXAMPLE 12

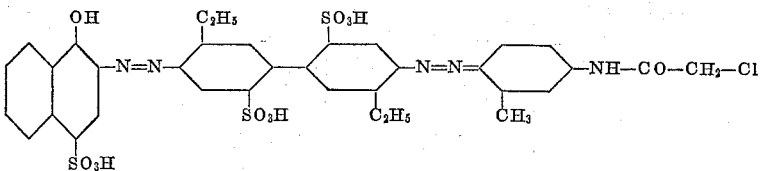

EXAMPLE 15

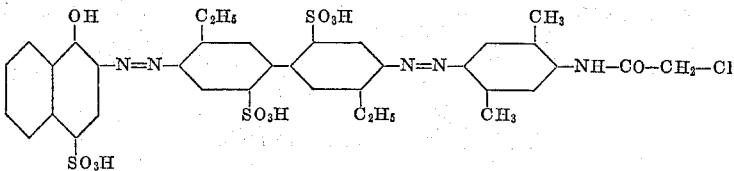

Having thus disclosed the invention, what we claim is:
1. Disazo dyestuff of the formula

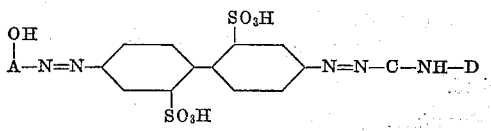

wherein

is the radical of a coupling component selected from the group consisting of 2-hydroxynaphthalene, 1-hydroxynaphthalene monosulfonic acid, 1-hydroxynaphthalene-disulfonic acid, 1-hydroxynaphthalene-trisulfonic acid, 2-hydroxy-naphthalene-monosulfonic acid, 2 - hydroxynaphthalene-disulfonic acid, 2-hydroxynaphthalene-trisulfonic acid, OH being in a position adjacent to the azo group, C is a 1,4-phenylene radical selected from the group consisting of

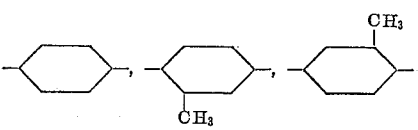

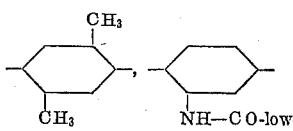

and

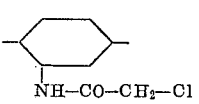

and
D is an acyl radical selected from the group consisting of halogenoacetyl, β-halogenopropionyl, propiolyl, methacrylyl, acrylyl, α-halogenoacrylyl, β-halogenoacrylyl, α - halogeno-crotonyl, β - halogeno-crotonyl, α-halogeno-β-carboxy-acrylyl, β-halogeno-β-carboxyacrylyl and α,β-dihalogeno-β-carboxy-acrylyl, halogen having an atomic weight between 35 and 81.

2. Disazo dyestuff of the formula

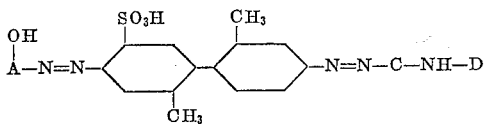

wherein

is the radical of a coupling component selected from the group consisting of 2-hydroxynaphthalene, 1-hydroxynaphthalene monosulfonic acid, 1-hydroxynaphthalene-disulfonic acid, 1-hydroxynaphthalene-trisulfonic acid, 2-hydroxy-naphthalene-monosulfonic acid, 2 - hydroxynaphthalene-disulfonic acid, 2-hydroxynaphthalene-trisulfonic acid, OH being in a position adjacent to the azo group, C is a 1,4-phenylene radical selected from the group consisting of

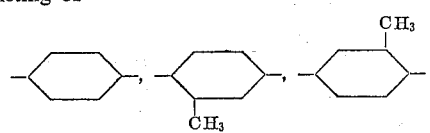

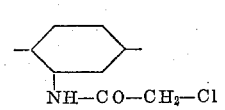

and

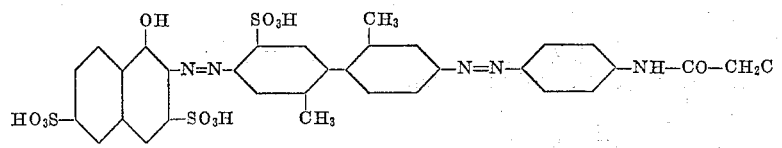

and

D is an acyl radical selected from the group consisting of halogenoacetyl, β-halogenopropionyl, propiolyl, methacrylyl, acrylyl, α-halogenoacrylyl, β-halogenoacrylyl, α-halogeno-crotonyl, β-halogeno-crotonyl, α-halogeno-β-carboxy-acrylyl, β - halogeno-β-carboxyacrylyl and α,β-dihalogeno-β-carboxy-acrylyl, halogen having an atomic weight between 35 and 81.

3. The disazo dye of the formula

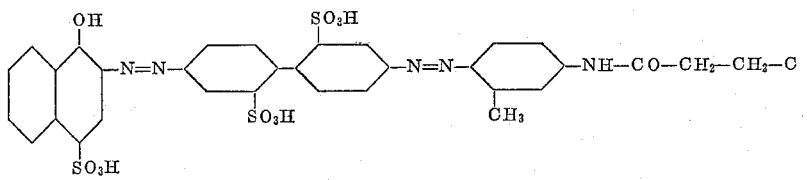

4. The disazo dye of the formula

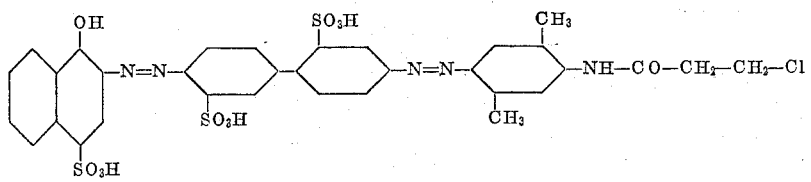

5. The disazo dye of the formula

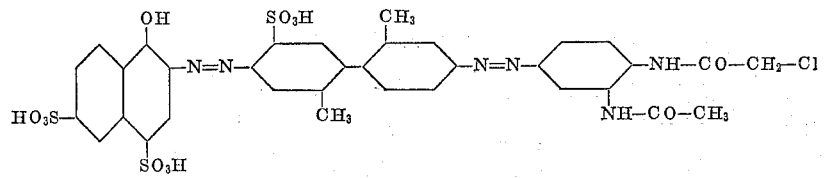

6. The disazo dye of the formula

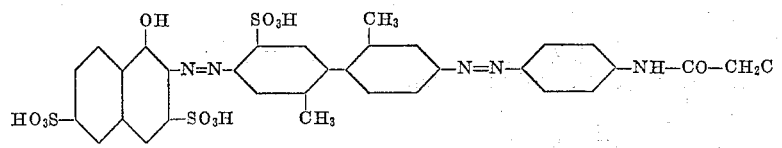

No references cited.

CHARLES B. PARKER, *Primary Examiner*.